(12) United States Patent
Burgemeister

(10) Patent No.: US 7,221,290 B2
(45) Date of Patent: May 22, 2007

(54) PACKETIZED VOICE COMMUNICATION METHOD AND SYSTEM

(76) Inventor: Alvin H. Burgemeister, 17507 SE 293rd Pl., Kent, WA (US) 98042-9462

( * ) Notice: Subject to any disclaimer, the term of this patent is extended or adjusted under 35 U.S.C. 154(b) by 92 days.

(21) Appl. No.: 10/926,436

(22) Filed: Aug. 24, 2004

(65) Prior Publication Data

US 2006/0046715 A1 Mar. 2, 2006

(51) Int. Cl.
*G08B 21/00* (2006.01)

(52) U.S. Cl. ........................ 340/945; 340/961; 340/951; 340/825.12; 455/431; 455/409; 455/517; 701/120; 701/14

(58) Field of Classification Search ................ 340/945, 340/947–959, 961, 825.12, 2.1; 701/120–122, 701/3–18; 455/431, 409, 517
See application file for complete search history.

(56) References Cited

U.S. PATENT DOCUMENTS

| | | | |
|---|---|---|---|
| 5,440,544 A * | 8/1995 | Zinser, Jr. .................. 370/319 |
| 5,448,768 A | 9/1995 | Zinser | |
| 5,652,783 A * | 7/1997 | Keba et al. ................. 370/313 |
| 6,185,430 B1* | 2/2001 | Yee et al. .................... 455/431 |
| 6,201,797 B1* | 3/2001 | Leuca et al. ................ 370/316 |
| 6,650,897 B2* | 11/2003 | Nelson ........................ 455/431 |
| 6,721,559 B1* | 4/2004 | Kocin et al. ................. 455/431 |
| 6,741,841 B1* | 5/2004 | Mitchell ................... 455/188.1 |
| 2005/0203676 A1* | 9/2005 | Sandell et al. ................. 701/3 |
| 2005/0257241 A1* | 11/2005 | Faulkner et al. ............... 725/92 |
| 2006/0003781 A1* | 1/2006 | Jin et al. ..................... 455/509 |

* cited by examiner

*Primary Examiner*—Jeffery Hofsass
*Assistant Examiner*—Hoi C. Lau

(57) ABSTRACT

A packetized voice communication method and system. Techniques are disclosed for supporting communication between aircraft and ground stations using packetized digitally-encoded messages. The encoded messages, which originate from verbalized messages, may be transmitted using conventional and future radio frequency (RF) radio communication technologies. Virtual channels are employed to enable a single ground station or controller to communicate with multiple aircraft by employing different physical radio transmission channels for the aircraft. Messages sent from aircraft to controllers are received by various ground antennas and routed to an appropriate ground station identified by each message's packet header. The messages for a given ground station are inserted into a queue that is manually or automatically advanced. Upon reaching the top of the queue, the message is decoded and played back at the controller's headset. Controller-to-aircraft messages are sent in a similar manner.

45 Claims, 7 Drawing Sheets

PACKETIZED VOICE COMMUNICATION METHOD AND SYSTEM

FIELD OF THE INVENTION

The field of invention relates generally to radio frequency (RF)-based communication and, more specifically but not exclusively relates to a method and system for implementing packetized voice communication using existing and future RF spectrum.

BACKGROUND INFORMATION

Numerous studies have shown that the air traffic services (ATS) community is running out of VHF (Very High Frequency) communication channels. This is especially true in the Northeast corridor of the United States and in Western Europe. The European solution has been to sub-divide the 25 kHz VHF voice channels into 8.33 kHz channels (that is, channels having an 8.33 kHz separation). The solution chosen by the United States is to multiplex up to four digital channels onto a single 25 kHz VHF channel, which can be used for either digital voice or data.

In oceanic and other remote parts of the world, the available voice communications for ATS is over HF (High Frequency) SSB (Single Side Band), which suffers from noise and variable propagation problems. Some of these problems have been mitigated for the air traffic controller by using radio operators to serve as a buffer between the controller and the radio. Airplane pilots flying in these regions, however, must continue to bear the burden of communicating in this bad environment. In other than polar regions, satellite voice has been developed, although it has not been put into regular use.

Under conventional practices, a pilot and controller normally communicate via VHF analog voice radio. A VHF channel is assigned to a particular air traffic control (ATC) sector. When an aircraft approaches that sector, the pilot is directed to tune the aircraft radio to the channel assigned to the sector. As a result, pilots are often required to change radio frequencies numerous times during a flight. Furthermore, additional separate frequencies are usually required for ground and approach control at each airport capable of handling commercial aviation traffic.

When a pilot or controller needs to transmit a message, (s)he first listens to the channel and waits for a quiet period in the traffic on that channel. For most channels, the transmissions are short and traffic is light enough that the wait is relatively short. In some highly-congested channels, however, the wait can be 30 seconds or more. During this time the pilot or controller must hold the message in a mental queue and give partial attention to the voice traffic. Judgment and experience are applied to determine whether a silence is the appropriate break for the sender's own message or if it is only a turn-around in an ongoing dialog. At the appropriate time, the pilot or controller presses the push-to-talk (PTT) switch and states the message, as rapidly and succinctly as possible, to minimize channel occupancy. Procedure dictates that the call sign of the intended receiver, followed by the call sign of the originator, be included at the beginning of the message, e.g., "Seattle Center, United 234 . . . " S(he) then listens to the channel for indication that the message was received without corruption. Failure to hear a valid acknowledgement might mean that two transmitters were activated at the same time and both failed to communicate or it may mean that the receiving person failed to hear the message. In either case the message must be retransmitted.

In addition to the air traffic control channel, pilots need to communicate with other ground entities. U.S. carriers are required by U.S. 14 CFR 121.99 to have communication capability with their dispatch center. Other carriers have similar requirements, either by law or by standard operating procedure. General aviation flights also have the need to contact ground service entities for weather and other operational messages. As a result, most aircraft are equipped with a minimum of two VHF communication radios and many have more radios to support their routes and operational needs.

The VHF radio for airline operational communications (AOC) has low usage for any one aircraft but traffic for other aircraft is present. In order to allow the flight crew to monitor these additional radios without the additional aural workload, a form of tone annunciation called SELCAL (selective calling) is provided. A call on a channel guarded by SELCAL requires that the originator enter the aircraft SELCAL address before making the initial call. A light and/or a tone annunciates an incoming call. The flight crew, when they see or hear the annunciation, activate the receiver audio and respond.

SUMMARY OF THE INVENTION

In accordance with aspects of the present invention a packetized voice communication method and system is provided. The system supports communication between aircraft and ground stations using packetized digitally-encoded messages and virtual communication channels. Embodiments of the system may be deployed to support automated radio tuning and management. Virtual channels are employed to enable a single ground station or controller to communicate with multiple aircraft by employing one or more different physical radio transmission channels for the aircraft.

According to one aspect of the invention, techniques are provided for transmitting messages from aircraft to selected ground stations. A person onboard an aircraft, such as a pilot, verbalizes (e.g., speaks) a message into a microphone. The message is digitally encoded into an encoded message, and the encoded message is inserted into one or more packets. Each packet includes a header identifying the source or sender of the packet and the destination for the packet. The packet(s) are sent via an assigned transmission channel for the aircraft to the selected ground station. Upon receipt at the ground station, the packet(s) are reassembled, as necessary, and the encoded message is extracted and placed in an inbound message queue. When a message reaches the top of the queue, it is decoded and played back over a speaker or controller headset, thus replicating the original verbalized message.

According to another aspect, techniques are provided for transmitting messages from ground stations to aircraft. First, an aircraft to transmit to is selected. Under various embodiments, the aircraft may be selected via a touchscreen, pointing device, retinal tracking, or voice recognition. In connection with identifying the aircraft, corresponding physical radio channel information is retrieved. The controller's verbalized message is encoded and packetized in a similar manner to that described above. The packet or packets is/are then routed to an appropriate ground antenna and transmitted to the aircraft. Upon receipt, the packet header is checked to verify the aircraft is the proper recipient. If it is, the message is extracted, stored and queued. When the onboard channel is clear (e.g., it is not being currently used to produce a verbalized message), the message is decoded and played back over a pilot headset or cabin speaker.

According to another aspect of the invention, an ATC system employing automated channel selection and tuning is provided. Multiple ground antennas are employed to facilitate a virtual radio communication channel, wherein the ground antennas broadcast radio signals having at least one of different radio frequencies and radio frequencies with different associated transmission domains. At least one underlying physical radio communication channel is assigned to each aircraft operating within a given airspace division. Verbal communication between ATC control facilities and aircraft is then facilitated by the assigned physical channels using the digitally-encoded message schemes discussed above. Under one embodiment, one or more dedicated radio management channels are employed to instruct the aircraft to which physical radio communication channel to tune to, wherein different aircraft within the same ATC sector may use different radio channels to facilitate communications with the same controller and/or control facility.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1A:
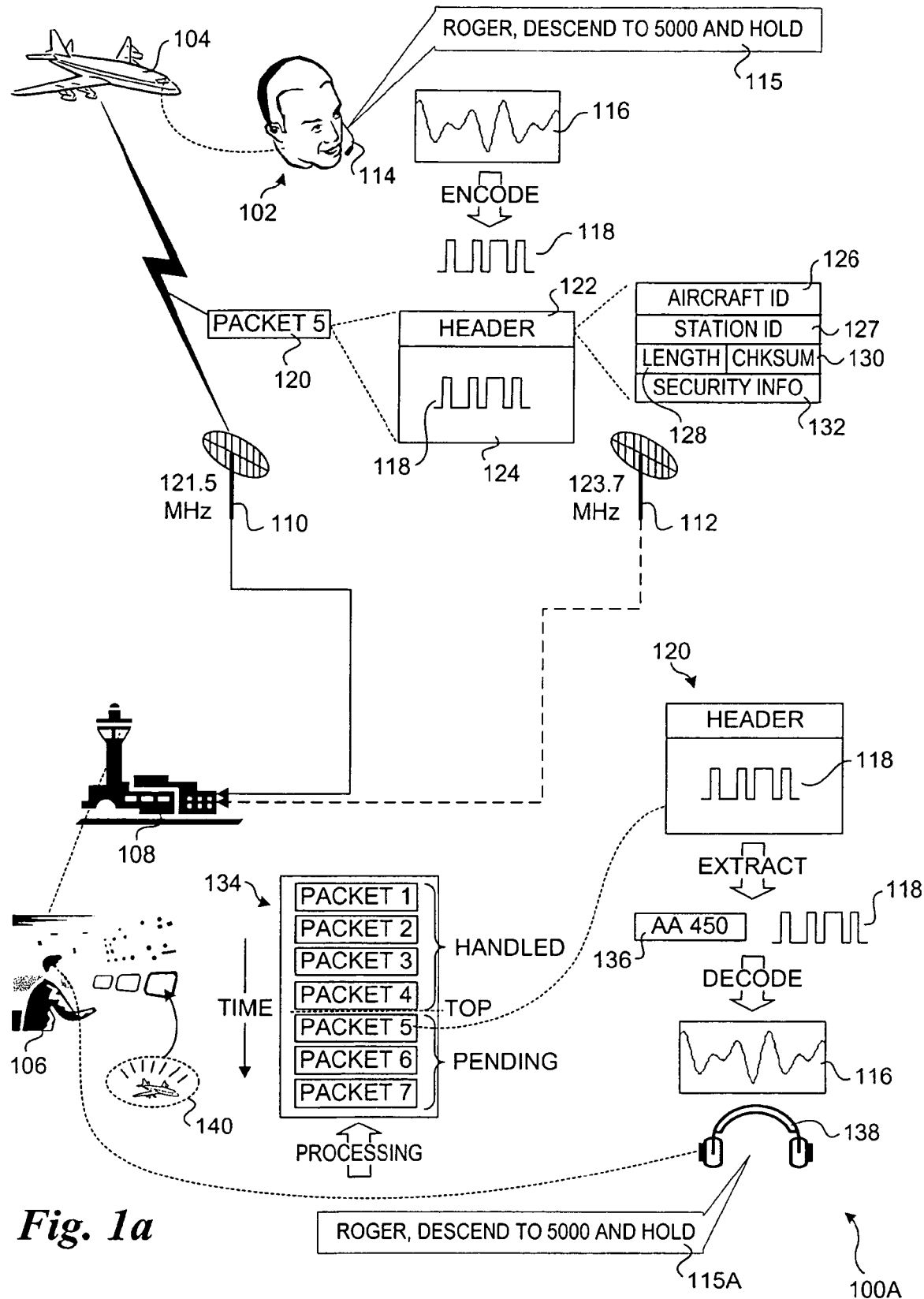
FIG. 1a is a schematic diagram of a system architecture to support aircraft-to-ground transmissions using a packetized voice communication system, according to one embodiment of the invention.

Embodiments of method and systems that enable packetized voice communication using, for example, conventional aviation and maritime radio frequencies are described herein. In the following description, numerous specific details are set forth, such as descriptions of packetized voice communication schemes employed for aviation purposes, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The embodiments of the present invention described below present a novel packetized voice communication system. Under the system, voice communications are packaged as digital data and transported to a (manually or automatically) selected destination using RF and ground communication means. Significantly, some embodiments of the invention remove the association between ATC sectors and corresponding frequencies, thereby enabling "virtual" communication channels using one or more underlying frequencies to handle more traffic than would be possible or practical using conventional VHF radios. In addition, the scheme can be extended to operate using other types of communication signals and RF spectrum, including existing and future wireless communication technologies.

Although a dialog between a flight crew and air traffic control is used to explain the concept in the following embodiments, the principles and teachings of the concept are very applicable to other aeronautical voice communications, such as between pilots and dispatch, pilots and maintenance, cabin crew and catering, etc. Since addressing of the communications is independent of the medium between the aircraft and the ground, multiple virtual dialogs can be established and multiplexed over common aircraft-to-ground media.

The communication community has defined two basic methods of communication. Circuit mode communication describes the case where a physical or virtual circuit is established between two nodes, such as two telephone handsets. The full resources of that circuit are dedicated to carrying information between those two nodes, whether the information is speech or music or the source is silent. By comparison, packet mode communication takes a group of information—a packet or message—and sends it from the origin to the destination, independent of any previous or subsequent packets.

Another key concept in communication is that of full-duplex vs. half-duplex communication. A telephone conversation is conducted over a full-duplex channel. Both ends of the conversation can talk and listen simultaneously, at least technically. By comparison, two-way radio communication, such as used by ATC, operates in half-duplex mode. Since both sources use a common channel, only one source can be transmitting at a time. Optimally, the sources alternate.

Since two, and typically more, sources have the need to send information over a channel, another communication concept, of multiple access protocol, is important for consideration. With a collision (or carrier) sense multiple access (CSMA) protocol, a source desiring to send a message listens to the channel and, when it determines the channel is free, sends the message. Another scheme for allocating the single channel to multiple senders is a token passing protocol, where a sender is allowed to send information only when in possession of a token. A time domain multiple access (TDMA) protocol is a special form of a token-passing scheme, where a virtual token is "passed" to each sender on a regular schedule and the sender only holds the token for a specific period of time. There are various schemes to assign the channel to those in need while not burdening the channel with unused time slots or with excessive overhead to handle the token. Frequency domain multiple access (FDMA) and code division multiple access (CDMA) are other protocol schemes to allow multiple users to share a common radio band. In any case, each protocol includes a method of acknowledgement to ensure the message was received and error-free.

Two-way radio communications, such as used for ATC, can be described using many of these concepts. For example, ATC voice is inherently a packet communication protocol. That is, the pilot or controller has a discrete message to send when (s)he presses the transmit switch. During the course of the relationship between the aircraft and the control sector there may be a number of individual messages, but each message is independent of any other, related only by the address pair of the sender and receiver. A circuit mode communications link provides no value to the process, especially if a circuit setup would add to workload and/or time delay for messaging. (A connection-oriented transport layer or other mechanism may be provided for the purposes of efficiency and integrity, but that is transparent to the users at both ends.) Also, as has been illustrated by development of SATCOM (satellite communication) voice, establishing a telephone-type circuit between the pilot and controller consumes precious (and expensive) resources. The compression algorithms of aviation Codecs proposed thus far are based on telephone industry techniques, which are optimized for circuit mode voice. They may (or may not) be optimum for a packet mode voice service.

ATC voice is inherently a half-duplex service. There is no requirement for the pilot and controller to talk simultaneously. A full duplex service would waste the unused bandwidth. On the other hand, either of the parties may need to send a priority message in spite of the fact that the other is currently transmitting. A pilot may declare an emergency or a controller may recognize an unsafe situation and need to make a transmission to resolve it. As will be seen, there are more appropriate ways than full duplex service for such an eventuality.

ATC voice communication, as practiced today, uses a CSMA protocol. This protocol is not implemented in hardware or software, however. Rather, the people controlling the push-to-talk button function as CSMA-like protocol engines. The pilot or controller must listen for a break in the traffic on the channel and then transmit his/her message, hoping that it will go through without error or interference. In high-congestion airspace, such as the terminal airspace of major airports, the channel may be so loaded that a pilot will have to wait up to 30 seconds before he can make a transmission. The conventional voice protocol includes error detection methods, including read-back, acknowledgements such as Roger and Wilco, and the feedback of a clearance seen by the controller when compliance is monitored on the radar screen. All of these protocol elements are error-prone, require mental workload that could be better used elsewhere, and contribute to message delay.

The amount of time required for a message to be delivered is called transit delay. To compare alternate communication concepts, transit delay should be measured from the time a message is ready to be sent until the time the receiver (normally a person) hears or reads the message. As discussed above, transit delay in a high-intensity environment can extend to as much as 30 seconds.

In view of the foregoing conventional practices, limitations, and requirements, a novel "packet voice" communication scheme has been defined, embodiments of which are disclosed below. In general, the packet voice concept alleviates much of the communication traffic management aspects that are currently handled by pilots and controllers. Moreover, embodiments are provided that automate nearly all aspects of the channel selection and bandwidth allocation considerations.

One general concept of the packet voice scheme is that the pilot (or controller) presses the microphone key and speaks messages when ready, without needing to ensure that an open voice radio channel is available. After the pilot or controller releases the microphone key (or sooner in the case of a longer message) the system digitizes the analog voice signal, compresses it, and then sends the message as one or more packets over an airplane-to-ground or ground-to-airplane channel. The system, not the human operators, is responsible for finding an appropriate radio channel; sending the packet(s) of data as determined by the protocol of that channel; and re-sending the packets, or the entire message, if the receiver fails to acknowledge receipt. In addition, the digitized and compressed voice message may include identifiers (e.g., addresses) for message source and destination, appropriate security authentication information, priority assertions, and other information.

One of the primary concerns in implementing the packet voice scheme is that of human factors. In brief, pilots and controllers are used to certain communication "protocols" that have seen little change over time. In many ways, these protocols are not "mechanized" (e.g., through some type of communication standard and corresponding hardware), but are more akin to general operating procedures. In view of these standard practices, aspects of the embodiments have been designed to minimize the differences with conventional pilot and controller operations. For instance, the microphone and speaker/headphone interface are identical to today's system, both in the aircraft and at the controller's workstation.

However, there are many aspects that are different from the conventional radio communication techniques. A primary difference is that the pilot/controller does not need to wait for a break in the incoming messages to key the microphone and begin talking. When ready to talk, the pilot/controller just presses the microphone key and begins talking. The task of ensuring that the message is sent without interruption is performed by the system. In the case of an emergency, the pilot/controller can transmit immediately with confidence that the message will be appropriately processed and delivered to the destination.

In one embodiment, the only messages received are those intended for the target recipient. Thus, in the cockpit, the only voice dialog will typically be with the controller for the sector or portion of controlled airspace the aircraft is operating in. Therefore, identification of whether a particular message is meant for that aircraft is not an issue. The common cockpit conversation "Was that call for us?" will fade into history.

One side benefit of the packet voice concept is the capability to easily review previous incoming messages. This is especially useful when receiving a long message, such as a departure clearance, but is useful under other circumstances. Messages can be reviewed in the cockpit or at an ATC ground station.

At the controller's workstation, a queuing scheme is employed for the incoming voice messages from the aircraft in the controller's sector (and perhaps calls from adjacent controllers, for implementations where the overall concept is extended to that function) so the messages may be processed by the controller in the order they are received. In one embodiment, incoming voice messages are queued to the controller's headset, with appropriate time gaps between messages. During the time the controller is keying his/her own microphone, incoming messages wait in the queue. In one embodiment, outbound messages, from either the controller or pilot, may also be queued in a similar manner, wherein the messages are sent when the channel is clear.

Figure 2A:
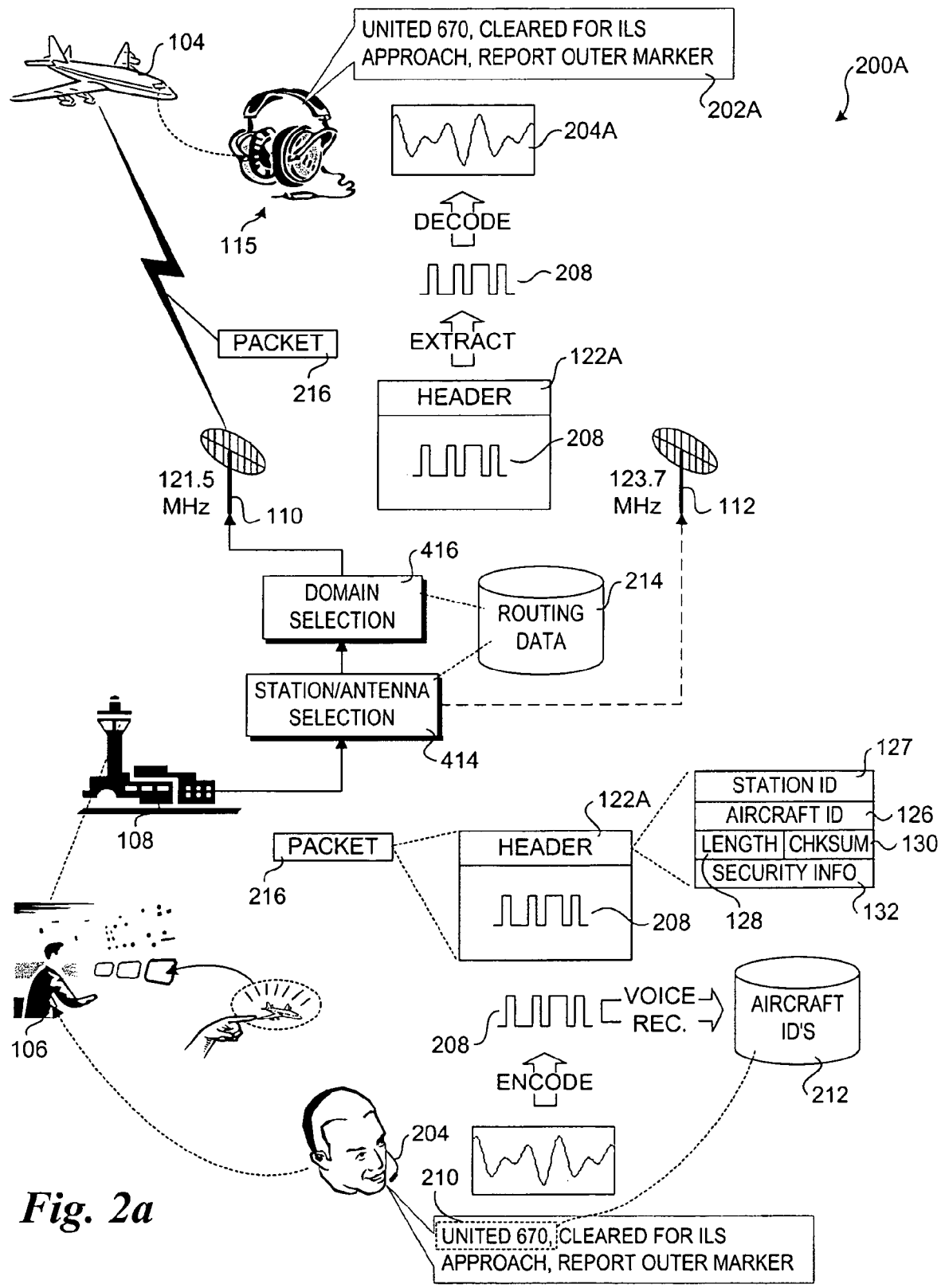
FIG. 2a is a schematic diagram of a system architecture to support ground-to-aircraft transmissions using a packetized voice communication system, according to one embodiment of the invention.

Aircraft-to-ground and ground-to-aircraft packet voice transmission system architectures 100A and 200A corresponding to one embodiment of the invention are shown in FIGS. 1a and 2a, respectively. The system architectures enable communication between a pilot 102 operating an airplane 104 with an ATC controller 106. For illustrative purposes, controller 106 is depicted at a control tower 108; however, the controller may generally reside at any type of ATC ground facility.

The system architecture 100A illustrates a base-level implementation of the invention, wherein packet voice concepts are employed using conventional radio channel selection techniques. For instance, system architectures 100A and 200A include a VHF ground station 110 depicted as operating at 122.5 MHz. In an optional configuration, a second VHF ground station 112 is provided, operating at an exemplary 123.7 MHz channel. As described below in further detail, a combination of VHF ground stations operating at different channel frequencies may be deployed to implement a single virtual channel. In addition, a single VHF ground station operating at a single channel frequency may be deployed to support multiple virtual channels. In addition, VHF ground stations are merely illustrative of one frequency band that may be used to facilitate packet voice communications. In general, any existing and future radio RF spectrum bands and underlying transceivers may be implemented in a similar manner. This includes, but is not limited to HF, L-Band, C-Band, and satellite-based communication technologies.

Figure 3:
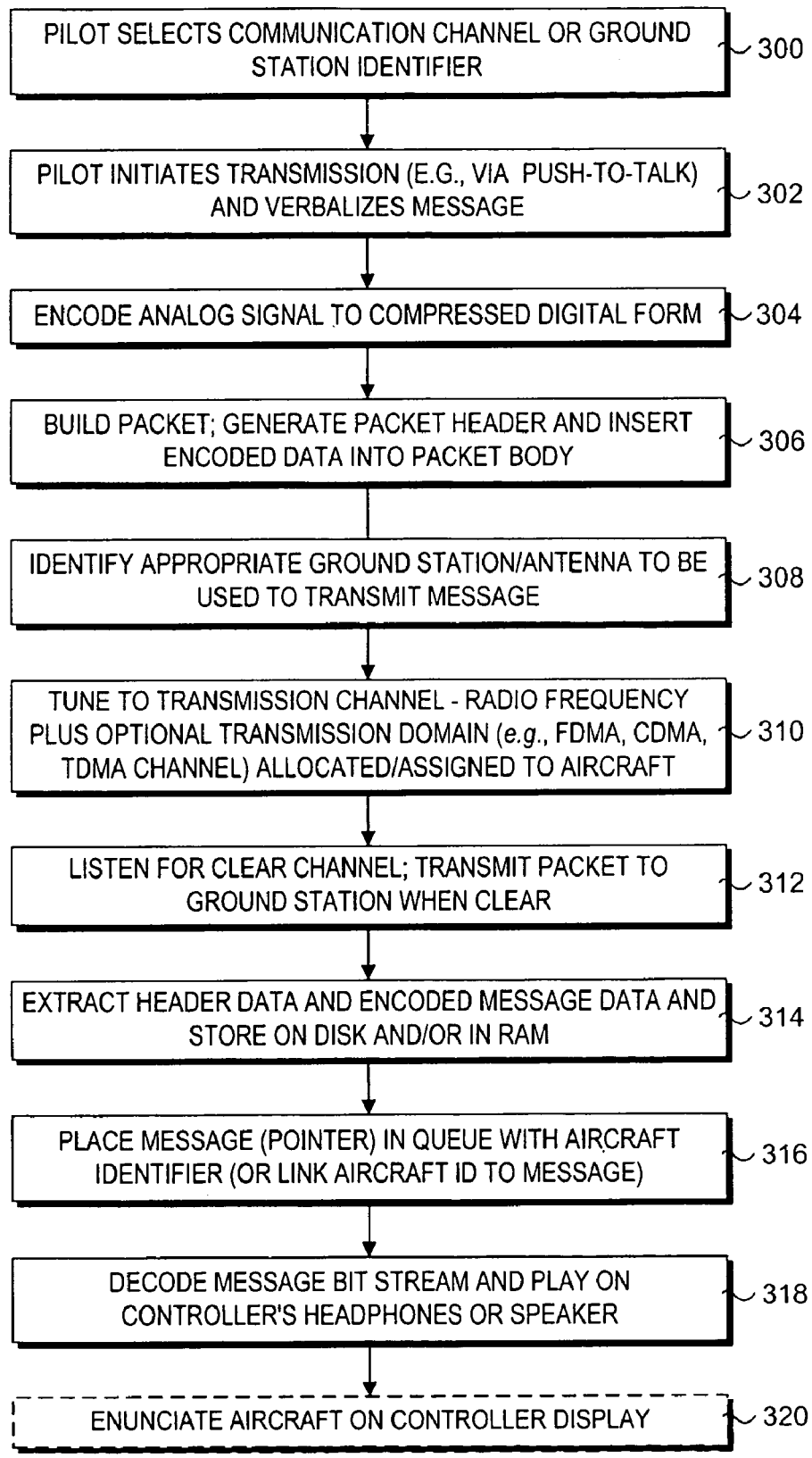
FIG. 3 is a flowchart illustrating operations that are performed to transmit a message from an aircraft to a controller using the packetized voice communication system, according to one embodiment of the invention.

With reference to system architecture 100A and the flowchart of FIG. 3, the communication process begins with pilot 102 selecting a communication channel or ground station identifier in a block 300. Under one embodiment, radio communications are conducted in a similar manner to today's mode of operations, wherein radio frequencies are selected in view of controller requests and/or navigation charts. Under another embodiment, each ground station is assigned a unique address and/or name. Accordingly, communication with the ground station is initiated by entering the station's unique address or name via a control panel or the like. In yet another embodiment, radio channels are virtual channels, and channel selection is automatically managed by system components on the ground and aboard the aircraft. Further details of this implementation are described below.

In a block 302, pilot 102 initiates a particular outbound transmission by activating his microphone 114, e.g., via activation of a push-to-talk button or the like. Immediately following this activation, the pilot verbalizes a voice message 115, such as the exemplary message of "Roger, descend to 5000 and hold" depicted. The voice message 115 is picked up by microphone 114 to produce an analog signal depicted as an analog waveform 116. In a block 304, the analog signal is encoded by converting it into a digital bit stream and compressing it using well-known encoding techniques, thereby producing an encoded message 118. The encoded message 118 is then "packetized" in one or more packets 120 in a block 306. For simplicity, transmission of a single packet 120 is shown in FIG. 1a. In one embodiment, each message is transmitted as a single packet. In other embodiments, multiple packets may be employed, depending on the length of the transmission.

Each packet 120 includes a header 122 and a body 124. An exemplary header shown in FIG. 1a includes an aircraft identifier (ID) 126 (e.g., sender or source address), a station identifier (ID) 127 (e.g., a receiver or destination address), a length 128, an optional checksum 130, and optional security information 132. The header may also contain other information, as well. In one embodiment, the header is extensible, enabling an airline or the like to implement their own specific header information in addition to information used for basic communications. The body 124 will generally hold the data (i.e., the digitally-encoded message) to be transmitted.

After packet 120 has been built, it is transmitted to its destination, which in this example is control tower 108. In the illustrated embodiment, VHF ground station 110 represents an antenna that is linked directly with control tower 108. As described below in connection with other embodiments, a VHF ground station and/or antenna may be linked "indirectly" with a destination ground station via a private network.

In accordance with the foregoing, an appropriate ATC ground station or antenna is identified in a block 308. In the case of "real" physical channels, the ground station will typically be any ground station having an antenna tuned to receive RF signals on the frequency selected via the aircraft's radio that is employed for the communication. In the case of a ground station identifier or virtual channel usage, the appropriate ground station will be automatically selected via system components.

In a block 310, the radio is tuned to an appropriate transmission channel that has been allocated or assigned to the aircraft for the current airspace division the aircraft is operating in. For instance, a particular channel may comprise a radio frequency by itself or a radio frequency plus transmission division/sharing parameters (e.g., FDMA, CDMA or TDMA parameters). As used herein, the transmission sharing/division parameters are referred to as the transmission domain, which is used to define how channels operating on an underlying common radio frequency are divided. In general, the selection of transmission channels that employ transmission domains will be automatically handled in a manner that is transparent to pilot 102. It is noted that in some implementations, separate communication channels are employed for transmitting messages and receiving messages. These communication channels may share an underlying frequency and employ different transmission domain parameters, or may employ different frequencies.

Once the transmission channel is selected, the packet(s) are then transmitted to the ground station (e.g., control tower 108) in a block 312. In some embodiments, transmission domain considerations for a given channel are not employed. For example, the voice packet concept may be implemented over a standard VHF channel that is "shared" by all aircraft having radios tuned to that frequency. In this instance, the system "listens" for a clear channel opening (i.e., time period during which the channel is quiet (not being used)), and begins transmission of the packet(s) when such a condition is detected. To support this capability, an outbound message queue is maintained at the aircraft via on-board storage facilities. This is similar to conventional usage, wherein the pilot would listen for a clear channel; however, the listening and transmission operation are now automated, thus effectively providing the pilot with an always clear channel.

Upon receipt at control tower 108, the header data and encoded message bit stream are extracted and stored, as depicted by a block 314. In general, the storage operation may be facilitated by a computer storage means, such as volatile memory (e.g., random access memory (RAM), persistent storage means (e.g., disk drive), or a combination of the two. Data corresponding to or identifying packet 120, such as a pointer, is placed at the tail end of an inbound message queue 134 in a block 316. For illustrative purposes, multiple packets 1–7 are depicted in message queue 134, including four packets 1–4 that have already been handled (e.g., heard by controller 106, and three pending packets 5–7. Also for convenience, the packets are shown in their original form. In practice, pointers or the like will generally be used rather than the actual packets or extracted packed data.

Figure 5:
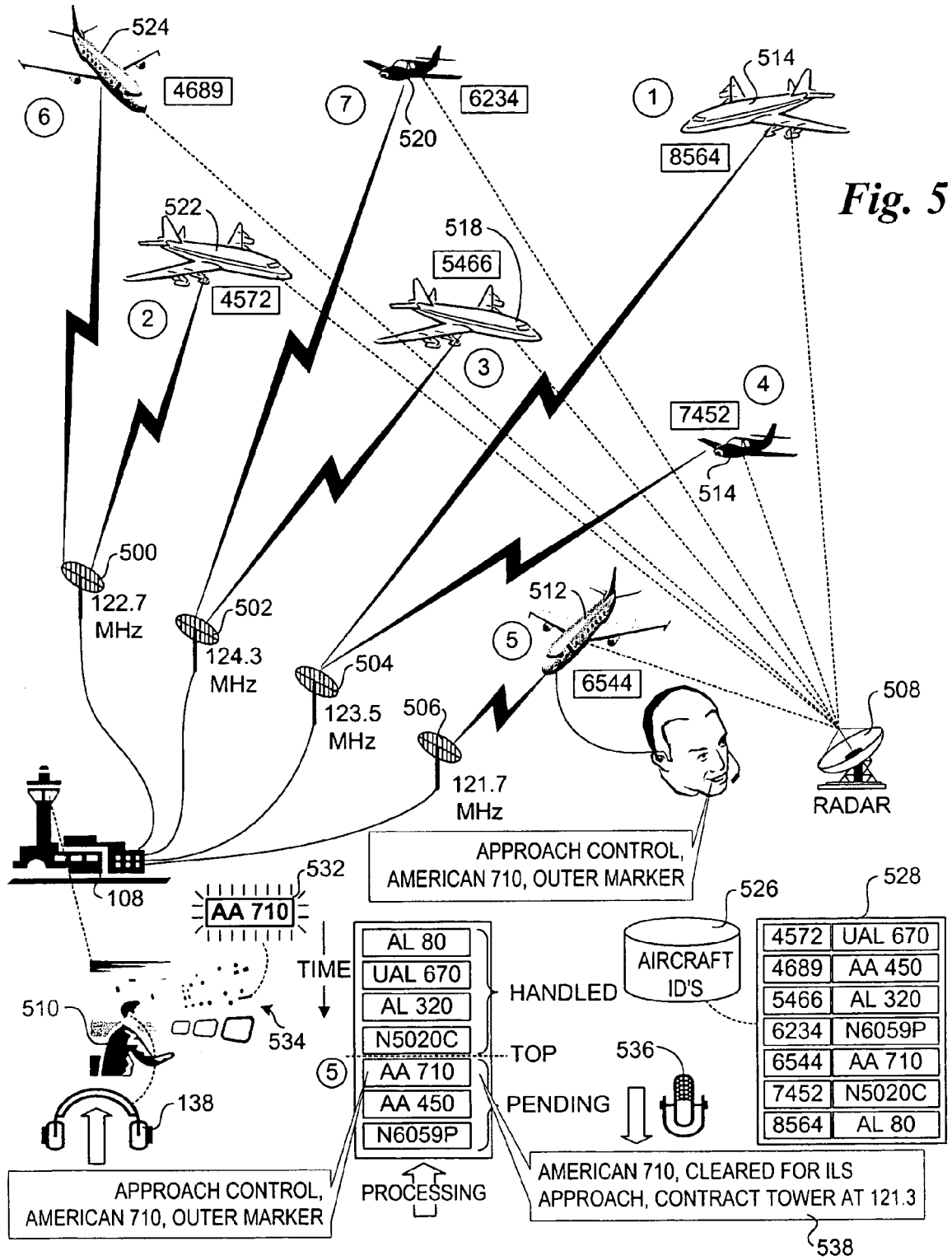
FIG. 5 is a schematic diagram of an exemplary usage of the packetized voice communication system, wherein four antennas are employed to facilitate a virtual communication channel used by an approach control facility.

In one embodiment, the encoded message 118 is first extracted from packet 120, and stored in a data structure along with aircraft identification information 136. Aircraft identification information 136 may or may not be the same as aircraft ID 126. As illustrated below in FIG. 5, techniques are provided for uniquely identifying each aircraft. In some embodiments, a "normal" aircraft identifier, such as a call sign, is employed. In other embodiments, an aircraft "address" or the like is employed.

In one embodiment, messages in inbound message queue 134 are processed in the order they are received. In another embodiment, messages may be prioritized, such that an emergency message is placed at the top of the queue upon being received. In one embodiment, the messages in inbound message queue 134 will be advanced via operation by controller 106, such as mike keying or the like. Under one implementation, indicia are provided to the controller to indicate a message is pending in the queue. Advancing a message pushes the message up in the queue until the message reaches the top of the queue. In one embodiment, message queue advancement is automated. In this case, the system "listens" for a quiet period to determine when to playback the next pending message at the top of the queue. The amount of time defining a quiet period should be made in view of human factors and operating considerations.

Once the message reaches the top of the queue, it is converted back to an analog form by a decoding process in a block 318 to yield a replicated analog waveform 116A, as described below. The replicated analog waveform 116A is then amplified and provided as a playback signal to headphones 138 worn by controller 106. Optionally, the amplified replicated analog waveform 116 may be "played" over a speaker proximate to controller 106. The net result is the controller hears a replication 115A of the original verbalized message 115 made by pilot 102.

In further detail, an analog voice signal (i.e., analog waveform) is converted to a digital signal (i.e., a digital bit stream) by first sampling and digitizing the analog signal, then applying the resulting digital bit stream to a coder/decoder (codec), where the digital bandwidth is reduced. At the receiving end, the signal is run through the same or suitable equivalent codec to recover the bit stream, which is then converted back to an analog form.

There are, in general, two forms of codecs. Source coders attempt to compress the signal from knowledge of how speech is created. In this form of coding, the creation of speech is modeled and parameterized. Generally, this type of coding results in synthetic sounding speech and its performance is largely dependent on the characteristics of the individuals' speech. Using this method it is possible to get transmission rates lower than 4 kbps. Waveform coders are concerned with replicating the original signal waveform. Consequently this type of coder is much more robust than the source coders and produces more natural sounding results. Two examples of this type of coder are Adaptive Differential PCM (ADPCM) and Continuously Variable Slope Delta (CVSD).

Almost all of the current voice digitizing technology assumes a continuous stream of information, whether the field of endeavor is computer audio and video or telephony. Packet voice, on the other hand, has the added characteristic that the message is normally short and concise. Therefore, batch file compression techniques, such as LZW, ZIP, and TAR, may provide a way to more tightly compress the digital packet for transmission while retaining all of the original information. If desired, research may be performed to determine more efficient ways of compressing the packet voice signal.

One of the advantages of using data communications technology is that one or more standard technology codecs can be specified for packet voice and additional codecs can be subsequently provided as the state of the art advances. The data communication protocols provide the capability to negotiate services such as compression based on the best technology available in the corresponding pair of stations.

In one embodiment, visual information is provided to controller 106 in conjunction with the playback of the incoming message to identify which aircraft sent the message. For example, the aircraft may be annunciated (e.g., highlighted, flashed, etc.) on the controller display in accordance with a block 320, as depicted by annunciated aircraft 140 in FIG. 1a, and an annunciated aircraft identifier 532 in FIG. 5, as discussed below.

In general, the entire encoding, packetizing, packet transmission, data extraction, and decoding process may be performed in real-time (as perceived by the human operators in a manner similar to modern cellular communication). However, the actual replication of the original message may be delayed, depending on if there are any pending messages in inbound message queue 134 and/or channel traffic. Compression of digital voice provides the very real possibility that a voice packet can be transmitted over the air-to-ground medium more rapidly than the words are spoken into the microphone or heard on the headset, minimizing the time of channel occupancy. This provides another example of how the packet voice concept improves radio channel use compared to current or proposed voice service. On the other hand, experience has shown that HFDL is capable of transporting data, albeit at slow bit rates, over radio channels that are incapable of use for analog voice due to propagation problems. In that case, the voice packet may take longer than it took to say the message but the HFDL protocol will ensure that it arrives reliably and will be intelligible.

System architecture 200A in FIG. 2a shows one embodiment of a ground-to-aircraft packet voice transmission scheme. In general, the encoding and decoding processes are similar to that described above, except for now the processes are flipped—encoding is performed at the ground station, while decoding is performed at the aircraft. However, the packet delivery aspects for ground-to-aircraft communication are a bit more complex than the aircraft-to-ground implementation of system architecture 100A.

Figure 4:
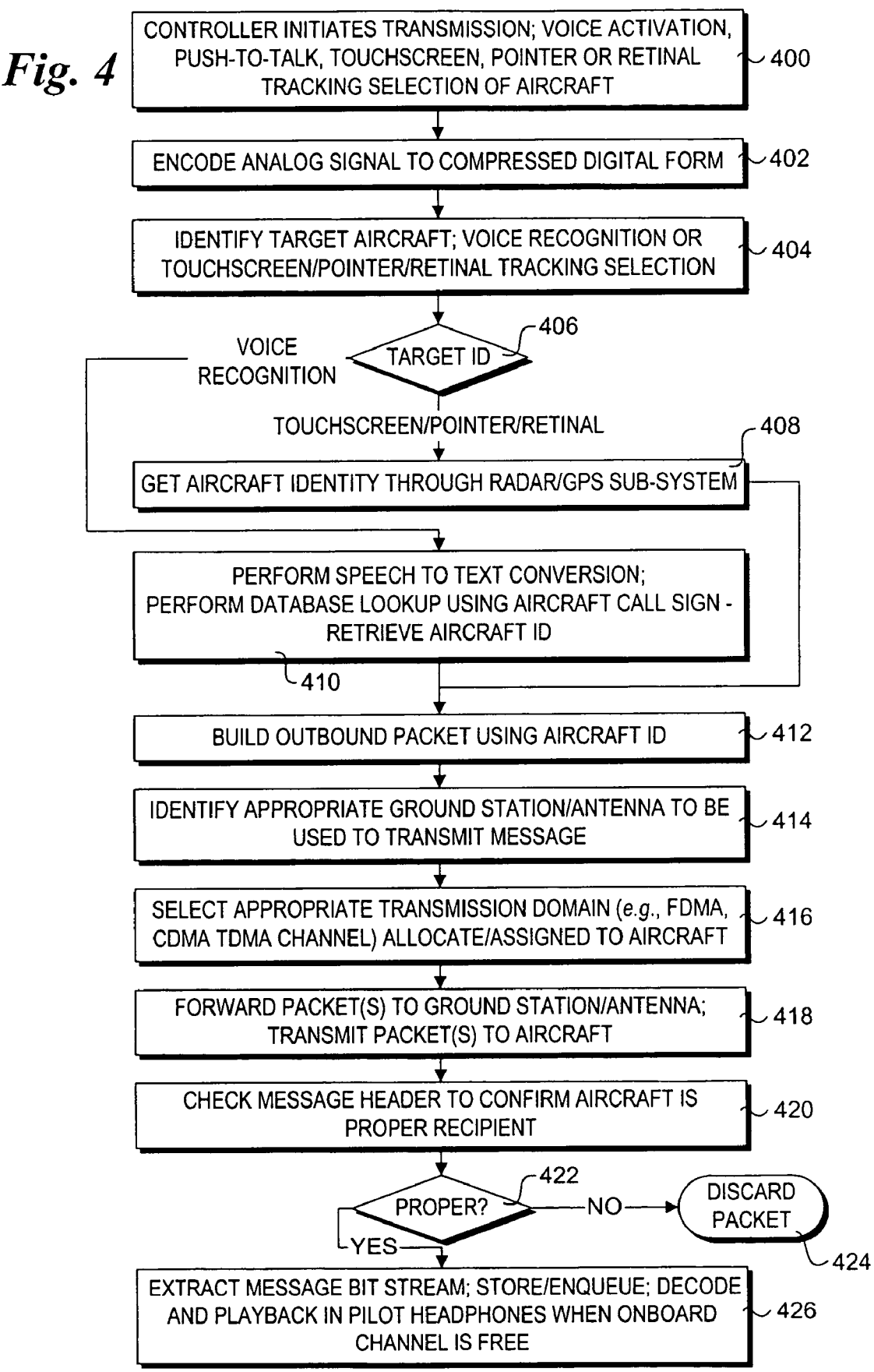
FIG. 4 is a flowchart illustrating operations that are performed to transmit a message from a controller to an aircraft using the packetized voice communication system, according to one embodiment of the invention.

With reference to the flowchart of FIG. 4 and FIG. 2a, the ground-to-aircraft transmission process begins in a block 400 with the controller initiating an outbound message via activation of a push-to-talk button or the like. In some instances, this may be voice activated. In one embodiment, the controller uses a touchscreen to "touch" the "aircraft" the controller would like to send the message to. As an option, a pointing device, such as a trackball or mouse may be used to move a pointer to facilitate a similar selection scheme.

In yet another embodiment, the aircraft is identified using retinal tracking. Recently, retinal tracking devices have been developed that enable an object on a screen to be identified by simply focusing on that object. Generally, the selection process would typically involve focusing on a particular aircraft icon in combination with activating a selection activation means, such as a button or foot switch, for example.

Next, in a block 402, the controller verbalizes a message 202, producing an analog signal 204 (via a microphone 206) that is encoded into a compressed digital form to produce an encoded message 208. In conjunction with the operations of block 402 (and block 400, in one embodiment), the target aircraft is identified via the operations depicted for blocks 404, 408, and 410 in view of the results of a decision block 406. The reason for identifying the aircraft is so the system knows to which aircraft to deliver the message. In contrast to a pilot-to-controller transmission, a given controller may be communicating with a significant number of aircraft. Under the conventional "party-line" scheme currently used, all of the aircraft under the control of controller 106 would be listening in on the same radio frequency used to broadcast the controller's messages, and thus hear all of the controller's messages, as well as messages made by other traffic. However, under some embodiments of the invention, messages are delivered only to targeted recipients. Accordingly, those recipients must be identified in some manner.

In one embodiment, a voice recognition scheme is used. Under this option, a speech-to-text conversion is performed on encoded message 208 in an attempt to identify the aircraft the message is targeted for in block 410. Under conventional practice, each new message sequence initiated by a controller begins with the aircraft call sign, such as depicted by a call sign 210 in message 202. The voice recognition scheme contains a speech-to-text converter, along with an aircraft identifier database 212. The aircraft identifier database 212 contains a list of aircraft ID's that are being controlled by control tower 108. This list may be derived from various techniques, such as, but not limited to flight plan information (e.g., via the corresponding flight progress strip), and the Final Approach and Spacing (FAST) software tool. Generally, aircraft identifier database 212 may be implemented as a standalone database, or may be combined with other databases, such as a routing data database 214 described below. The speech-to-text converter may also provide a "learning" feature, whereby the converter learns the speech patterns of particular controllers.

In another embodiment, the target aircraft is identified by the aforementioned touchscreen or trackball/mouse operation in block 400. Thus, when the controller touches the aircraft on his or her display, the display hardware, in conjunction with an aircraft locator system, such as a radar-based system or a GPS—(Global Positioning System) based system, automatically associates a representation of an aircraft on the display that is touched with an underlying identification for the aircraft. These operations are shown in block 408. In yet another embodiment, the retinal tracking technique is employed. In general, the additional (i.e., beyond the retinal tracking aspects) underlying identification system for this embodiment would be similar to that employed for the touchscreen selection scheme.

Once the aircraft is identified, an outbound packet 216 including a header 122A and body containing encoded message 208 is built in a block 412. In one embodiment, header 122A is analogous to header 122 discussed above, except that the aircraft ID 127 and station ID 126 fields are reversed in order.

Another level of complexity relates to identifying an appropriate transmission frequency and domain. Generally, there are two considerations—which ground station/antenna to transmit with, and which domain for that transmission source to use. Under the simplest implementation, a single frequency is used for communication within a given sector in a manner akin to current voice radio techniques. Furthermore, a base-level implementation may not employ any transmission domain division (i.e., frequency sharing scheme) outside of the conventional party-line principles. In this case, transmission may be as simple as transmitting the message via the ground station's antenna facilities.

However, it is envisioned that most implementations will involve greater complexity. For example, a virtual channel may be facilitated by multiple frequencies "tied to" a common virtual channel. Such a situation is illustrated in FIG. 2a, wherein antenna 110 and antenna 112 are used to communicate with traffic within the same sector or local airspace controlled by controller 106. Thus, transmissions over carrier frequencies of 122.5 MHz and 123.7 MHz may be concurrently employed for communication with traffic handled by a single controller. Accordingly, there is a need to identify which ground station or antenna (in situations when multiple antennas are operated by a common ground station) to transmit from.

The operation of selecting the ground station/antenna is performed in a block 416. In one embodiment, aircraft channel assignment information is maintained in routing data database 214 that identifies the virtual channel and underlying transmission parameters for a given aircraft operating within an airspace division being managed by the controller. This connection information would include information identifying what carrier frequency is used, and any applicable transmission domain information for that carrier frequency. Once the ground station/antenna is identified, any applicable transmission domain selection operations are performed in a block 416.

After the ground station/antenna and transmission domain information is determined, the packet(s) are forwarded to the appropriate antenna and transmitted to the aircraft (e.g., airplane 104) in a block 418. Upon receipt of the packet(s), the header is checked in a block 420 to confirm the aircraft is the intended recipient for the packet(s). In one embodiment, several aircraft share a frequency or frequency and transmission domain (if a transmission domain is being employed). Under this embodiment, each of the aircraft "listens" for inbound packet transmissions under their commonly-assigned frequency and optional transmission domain. Upon receipt, the header is checked to verify a listening aircraft is the appropriate recipient. If the aircraft is not the proper recipient, the packet is discarded, as depicted by a decision block 422 and an end block 424.

If the aircraft is determined to be the proper recipient in decision block 422, further processing is performed in a block 426, wherein the encoded message is extracted and stored onboard the aircraft. The encoded message may also be queued in a manner analogous to that described above for inbound messages. However, the number of messages in the queue will generally be much lower than that for the controller, e.g., a single message. One purpose for message queuing is that a message should not be played back while a pilot is verbalizing a message to be transmitted. When this onboard "channel" is clear (i.e., the pilot or other personnel onboard the aircraft ware not verbalizing any messages), the stored/queued encoded message is retrieved and decoded, and the resulting replicated analog signal 204 is played back at pilot headphones 115 to produce a replicated message 202A. These operations are depicted in a block 420.

Figure 1B:
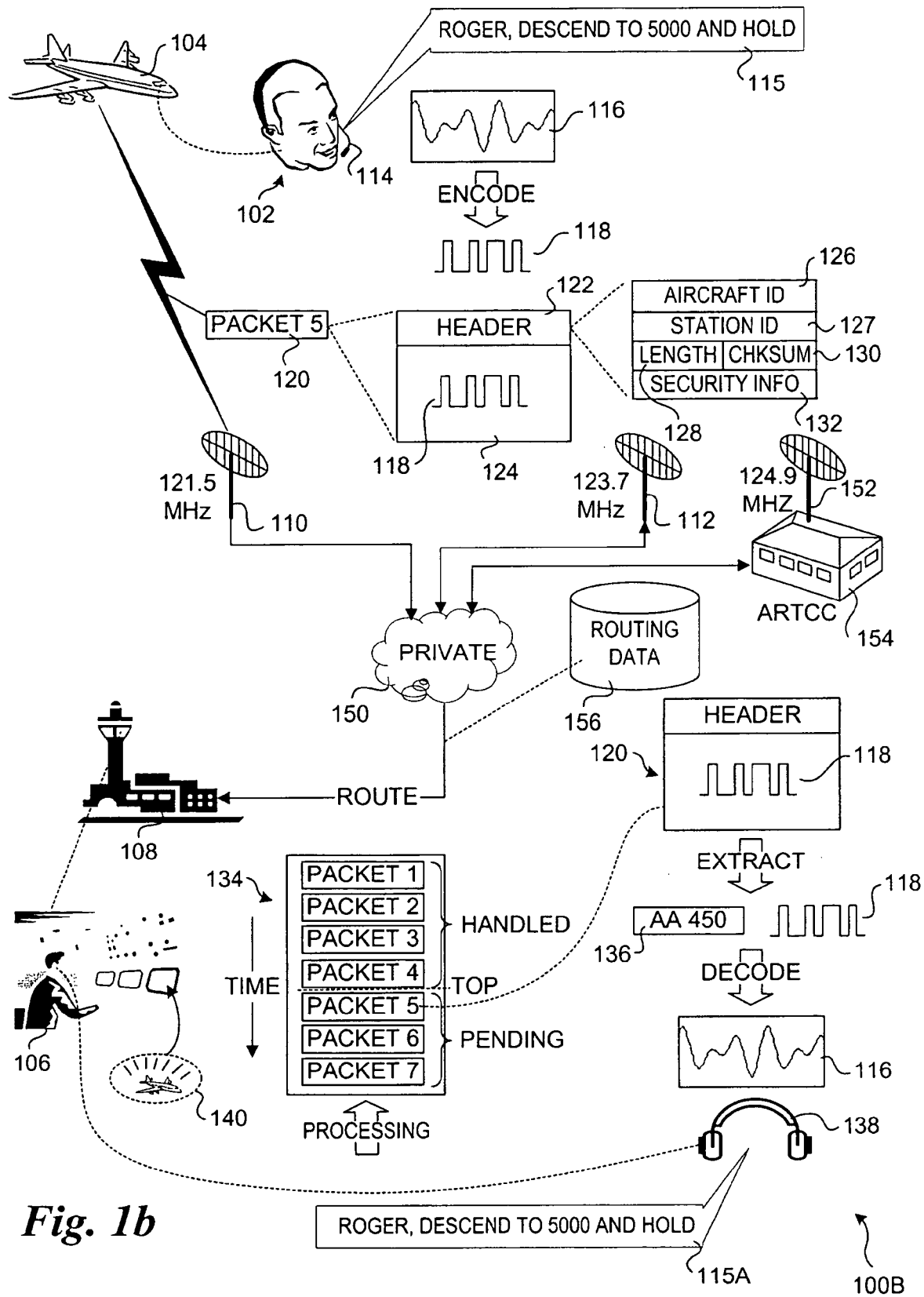
FIG. 1b is a schematic diagram of a system architecture that is a variation of the system architecture of FIG. 1a, wherein multiple antennas are employed to support a virtual channel.

FIG. 1*b* shows a system architecture 100B that is a variant of system architecture 100A in FIG. 1*a*. Under this configuration, various ground stations and antennas are networked together via a network 150. The antennas shown include antennas 110 and 112, as before, plus an antenna 152 operated in conjunction with an Air Route Traffic Control Center (ARTCC) 154. Furthermore, a given antenna may be employed to receive multiplexed transmissions destined for multiple different ground stations. Accordingly, a routing scheme is employed for routing the packets to the appropriate destination ground station.

In one embodiment, the routing scheme is facilitated by the station ID 127 value (e.g., the destination identifier or address) and a routing data database 156. Typically, the routing data database will include a table that maps each station ID to a corresponding ground station.

Figure 2B:
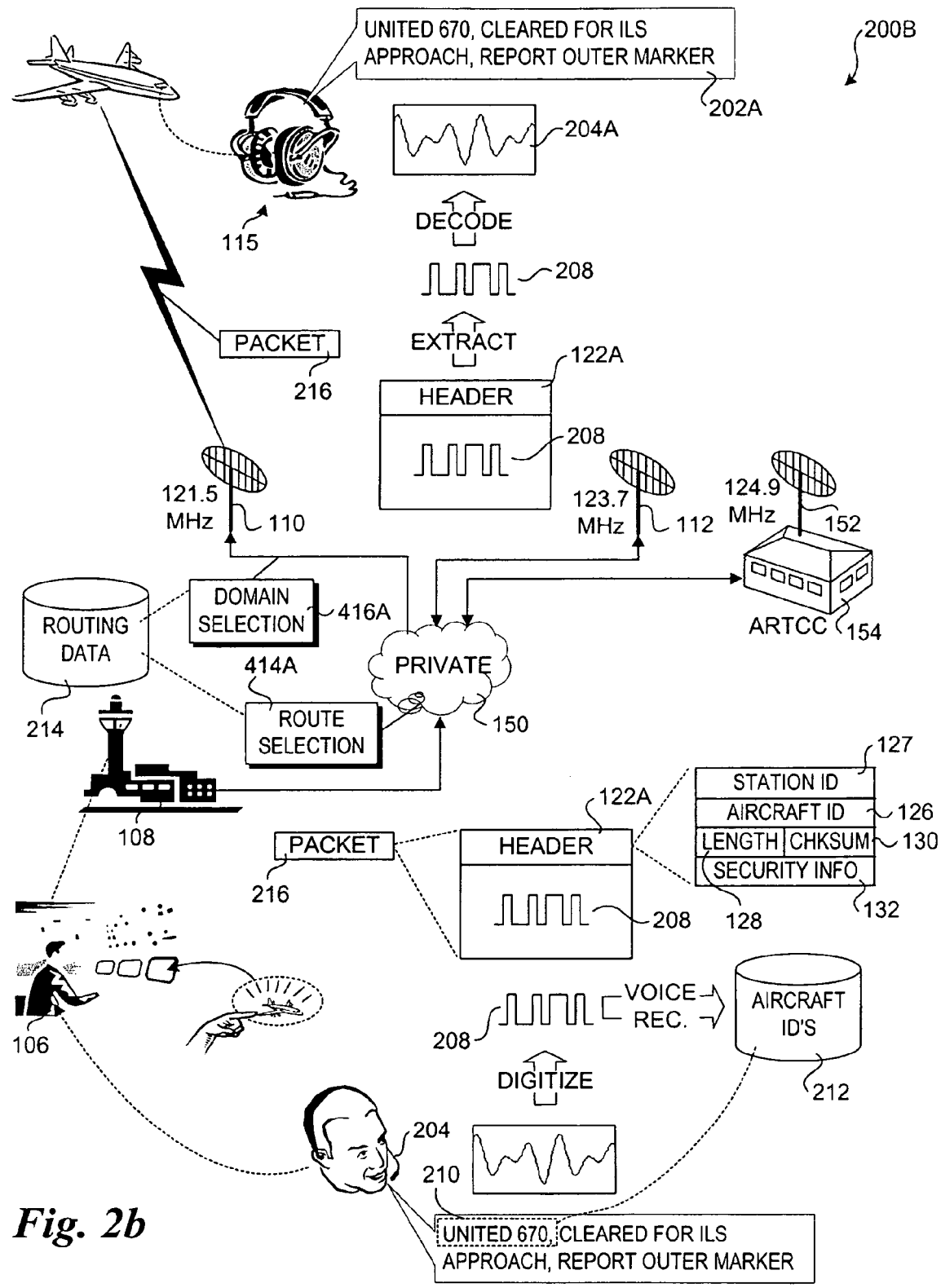
FIG. 2b is a schematic diagram of a system architecture that is a variation of the system architecture of FIG. 2a, wherein multiple antennas are employed to support a virtual channel.

A corollary (to system architecture 100B) system architecture 200B for ground-to-aircraft transmissions is shown in FIG. 2*b*. Under this embodiment, a route selection operation 414A that is similar to the station/antenna selection operations of block 414 in FIG. 4 is performed to route the outbound packet(s) to the appropriate ground facility or antenna. Once the packets are routed to the ground facility/antenna, a domain selection operation 416A akin to the domain selection operation of block 416 is performed to select the appropriate carrier frequency and transmission domain.

In several respects, the general principles discussed above may leverage existing techniques and infrastructure. For instance, the packet voice application is a type data communication application. Therefore, any of the routing capability provided for data communication is also available for voice communication. In typical domestic en route and terminal airspace, VHF Data Link is presumed to be the most appropriate medium for voice and data communication, although other RF communication means may also be used. The C-band data communication channels being discussed by the aeronautical community are assumed to provide excellent performance over a shorter range than VHF. Therefore, as the aircraft approaches the airport (and during the initial departure from an airport), the C-band radio could be used since it provides improved quality of service. For flight in oceanic and remote airspace, satellite or HF radio links might provide the only available communication path. While the aircraft is parked at the gate, a short-range Gatelink might be used, further reducing the load on longer-range channels. Unlike the current system, the medium over which the voice packets are transported is independent of the location of the person with whom the aircraft crew is communicating. Selection of the medium is done automatically, without intervention on the part of either the flight crew or the controller.

If the concept is extended beyond air traffic and aircraft operations (safety services), some air-ground links may be inappropriate for non-safety services. The ATN routing definition already provides for the selection of the appropriate air-ground link for each message. The routing concept also provides for the capability to restrict safety service messages to only authorized air-ground links.

In general, selection of the particular channel for packet voice over VHF, C-band, or HF would be independent of the controller location, just as it is today for ACARS, VDL-2, and HFDL. The radio channel protocol is based on optimum use of channel bandwidth and is not constrained by air traffic sectorization. Selection of a particular channel is based on the need to share the load among all available channels, optimizing the performance for all. Selection of a particular ground station is also made to optimize the path between the aircraft and the ground, unbounded by the identity of the control sector or other ground entity exchanging voice packets with the aircraft.

Although air traffic control is a primary user of VHF and HF communication bandwidth in the aeronautical spectrum, there are other users that can also benefit from the packet voice concept. The flight crew can talk with company dispatch or maintenance personnel located on the ground by selecting the address of the appropriate ground station. The cabin crew can similarly talk with peer service entities on the ground. In both cases, selection of the necessary address is all that is required. The need to "patch me through to maintenance" would be eliminated. There is no need for selecting a particular radio or a specific frequency on that radio. The cabin crew, for instance, would not need to be aware of whether the aircraft is within direct line-of-sight of a ground station because the voice packets would be routed by the best available path. Similarly, a ground entity could contact an aircraft without foreknowledge of the location of that aircraft.

Because the packet voice concept does not require dedication of a radio channel to one ground entity, it is possible to multiplex packet voice services with multiple ground services. An airline flight crew can communicate with maintenance or dispatch while continuing to monitor air traffic control. Similarly, a general aviation aircraft can call for weather or report on weather while remaining in contact with air traffic control. A queuing system similar to that described above for controller workstations would ensure no message was missed.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for performing air traffic control (ATC) communications, comprising:
    employing multiple ATC radio facilities to facilitate a plurality of virtual radio communication channels used to communicate with aircraft within an ATC airspace division controlled by an ATC control facility, the multiple ATC radio facilities broadcasting radio signals having at least one of different radio frequencies and radio frequency with different associated transmission domains;
    assigning communications for each aircraft within the ATC airspace division to a virtual radio communication channel employing an underlying physical radio communication channel having one of a radio frequency or radio frequency and associated transmission domain;
    sending verbal communications between the ATC control facility and aircraft within the airspace division as digitally-encoded messages using the virtual radio communication channels assigned to each aircraft,
    wherein each digitally-encoded message is enabled to be decoded and played back at a destined aircraft or ATC control facility to replicate the verbal communication associated with that message.

2. The method of claim 1, wherein a digitally-encoded message is transmitted using a physical radio communication channel having a frequency within the frequency spectrum defined for Very High Frequency (VHF) radio communications.

3. The method of claim 1, wherein a digitally-encoded message is transmitted using a physical radio communication channel having a frequency within the frequency spectrum defined for High Frequency (HF) radio communications.

4. The method of claim 1, wherein a digitally-encoded message is transmitted using a physical radio communication channel having a frequency within the frequency spectrum defined for of C-band, L-band, and satellite-based radio communications.

5. The method of claim 1, further comprising:
    tracking an aircraft along a flight path passing through multiple airspace divisions; and
    sending information to the aircraft instructing the aircraft to what physical radio communication channel to employ for the virtual radio communication channel while operating within a given airspace division.

6. The method of claim 5, further comprising:
    automatically tuning a communication radio for the aircraft to communicate with via the virtual radio communication channel assigned to the aircraft.

7. The method of claim 5, further comprising:
    changing the physical radio communication channel at least once as the aircraft proceeds along the flight path; and
    in response to a change in the physical radio communication channel from an existing physical radio communication channel to a new physical radio communication channel,
    associating the virtual radio communication channel assigned to the aircraft with the new physical radio communication channel.

8. The method of claim 1, further comprising:
    assigning one of a unique address or unique identifier for each aircraft and ATC control facility in an ATC system; and
    employing the unique address or unique identifier to route the digitally-encoded messages to a message recipient.

9. The method of claim 8, further comprising:
    enabling a pilot of an aircraft to verbally communicate with a selected ground station by entering the unique address or unique identifier assigned to that ATC control facility.

10. The method of claim 1, further comprising:
    employing at least one dedicated channel as a radio management channel used to communicate instructions to aircrafts indicating which physical radio communication channel to tune to.

11. The method of claim 1, further comprising:
    enabling originating communication parties to verbalize voice messages into their respective radios irrespective of other voice messages being handled within the ATC airspace division, each voice message intended for a respective recipient; and
    handling the voice messages such that they are delivered to radio's operated by each voice message's intended recipient and enabled to be heard by the intended recipient.

12. The method of claim 11, further comprising:
    queuing an outbound voice message at an originating radio;
    detecting that a physical radio communication channel is clear; and
    transmitting the voice message from the originating radio to a radio operated by an intended recipient when the physical radio communication channel is clear.

13. The method of claim 1, further comprising:
    receiving digitally-encoded messages intended for a controller from aircraft operating within the ATC airspace division at an ATC control facility associated with the controller;
    queuing the digitally-encoded messages at the ATC control facility; and
    enabling the playback of the digitally-encoded messages so they can be heard by the controller.

14. The method of claim 13, further comprising:
    receiving a digitally-encoded message comprising a digital form of a voice message spoken by a pilot of an originating aircraft;
    inserting one of the digitally-encoded message, an attribute of the digitally-encoded message, or indicia identifying a storage location of the digitally-encoded message into an inbound message queue;
    incrementing the inbound message queue until said one of the digitally-encoded message, attribute of the digitally-encoded message, or indicia identifying a storage location of the digitally-encoded message is at the top of the inbound message queue; and in response thereto,
    decoding the digitally-encoded message to produce an analog signal comprising a replicated message; and
    playing back the replicated message over a speaker or headset to enable the message to be heard by the controller.

15. The method of claim 1, further comprising:
    facilitating transmission of verbal communications between aircraft and at least one ATC radio facility associated with the controller using at least two different physical radio communication channels,
    wherein each verbal communication comprises a communication between an aircraft and the controller and transmission of at least portions of multiple verbal communications may be performed concurrently.

16. The method of claim 1, further comprising:
    facilitating communication between the plurality of aircraft within the ATC airspace division and the controller by employing at least two ATC radio facilities, each ATC radio facility employing a different physical radio communication channel comprising at least one of a different radio frequency and a different transmission domain to communicate with aircraft within its reception area.

17. The method of claim 1, further comprising:

enabling a pilot of a first aircraft to press a push-to-talk (PTT) button associated with the first aircraft's radio and verbalize a first voice message into a microphone of the first aircraft's radio, the first voice message intended for an ATC controller at the ATC control facility;

enabling a pilot of a second aircraft to press a PTT button associated with the second aircraft's radio and verbalize a second voice message into a microphone of the second aircraft's radio, the second message intended for the ATC controller;

delivering the first and second voice messages to the ATC controller; and enabling each of the first and second voice messages to be played back individually so as to be heard by the ATC controller, wherein at least a portion of the first and second messages are enabled to be verbalized at the same time.

18. The method of claim 17, further comprising:

transmitting the first voice message from the first aircraft to the ATC controller using a first physical radio communication channel; and transmitting the second voice message from the second aircraft to the ATC controller using a second physical radio communication channel.

19. The method of claim 17, further comprising:

asynchronously transmitting each of the first and second voice messages from the first and second aircraft, respectively, to an ATC radio facility associated with the ATC controller using the same communication channel.

20. The method of claim 1, further comprising:

enabling a pilot of a first aircraft within the ATC airspace division to press a push-to-talk (PTT) button associated with the first aircraft's radio and verbalize a first voice message into a microphone of the first aircraft's radio, the first voice message intended for an ATC controller at the ATC control facility;

enabling the ATC controller to press a PTT button associated with an ATC radio and verbalize a second voice message into a microphone of the ATC radio, the second message intended for a second aircraft;

delivering the first voice message to the ATC controller; and delivering the second voice message to the second aircraft, wherein at least a portion of the first and second messages are enabled to be verbalized at the same time.

21. The method of claim 20, further comprising:

transmitting the first voice message from the first aircraft to the ATC controller using a first physical radio communication channel; and transmitting the second voice message from the ATC controller to the second aircraft using a second physical radio communication channel.

22. The method of claim 20, further comprising:

asynchronously transmitting each of the first and second voice messages from their originating radios to recipient radios using the same physical radio communication channel.

23. The method of claim 1, further comprising:

encoding an analog signal corresponding to a voice message into a digitally-encoded message;

transmitting the encoded message to an ATC radio facility associated with the ATC airspace division; and forwarding, as necessary, the digitally-encoded message from the ATC radio facility to the ATC control facility.

24. The method of claim 23, further comprising:

inserting data corresponding to the digitally-encoded message into one or more packets;

transmitting the one or more packets from the aircraft to an ATC radio facility enabled to receive radio transmissions associated with the virtual radio communication channel assigned to the aircraft;

forwarding, as necessary, the one or more packets from the ATC radio facility to the ATC control facility at which the controller is stationed; and extracting the digitally-encoded message from the one or more packets.

25. The method of claim 24, wherein each packet includes a header that identifies the source of the encoded message and a recipient ATC control facility for which the digitally-encoded message is intended.

26. The method of claim 25, wherein the ATC radio facility is coupled to the ATC control facility at which the controller is stationed via a network, which, in turn, is coupled to multiple ATC facilities, the method further comprising:

determining which ATC control facility the digitally-encoded message is targeted for; and routing the digitally-encoded message to that ATC facility via the network.

27. The method of claim 25, further comprising:

determining at least one of a frequency and domain corresponding to a physical radio communication channel via which a digitally-encoded message is to be transmitted between an aircraft and the ATC control facility.

28. The method of claim 1, further comprising:

determining whether a digitally-encoded message sent to a recipient is acknowledged; and if not acknowledged, resending the digitally-encoded message to the recipient.

29. The method of claim 1, further comprising:

storing a digitally-encoded message sent to an aircraft onboard the aircraft; and enabling the digitally-encoded message to be played back a plurality of times.

30. The method of claim 1, further comprising:

enabling a controller at the ATC control facility to verbalize a voice message intended for a target aircraft from among the aircraft within the ATC airspace division;

enabling the controller to identify the target aircraft;

automatically identifying a transmission mechanism associated with the target aircraft identified by the controller; and sending the voice message from an ATC radio facility associated with the controller to the target aircraft via the transmission mechanism that is identified.

31. The method of claim 30, further comprising:

enabling multiple inbound voice messages sent from the aircraft to be received via the physical radio communication channels;

enqueuing the inbound voice messages into an inbound message queue; and enabling the controller to dequeue messages in the inbound message queue and listen to the messages individually.

32. The method of claim 31, further comprising:
storing the digitally-encoded message on a storage means onboard the target aircraft;
inserting one of the digitally-encoded message or indicia identifying a storage location of the digitally-encoded message into an inbound message queue; and
playing back the replicated message when said one of the digitally-encoded message or indicia identifying a storage location of the digitally-encoded message is at the top of the inbound message queue and an outbound message is not being verbalized by an occupant of the target aircraft.

33. The method of claim 31, further comprising:
receiving a digitally-encoded message comprising a digital form of a voice message spoken by a pilot in an originating aircraft;
inserting one of the digitally-encoded message, an attribute of the digitally-encoded message, or indicia identifying a storage location of the digitally-encoded message into the inbound message queue;
incrementing the inbound message queue until said one of the digitally-encoded message, attribute of the digitally-encoded message or indicia identifying a storage location of the digitally-encoded message is at the top of the message queue; and in response thereto,
decoding the digitally-encoded message to produce an analog signal comprising a replicated message; and
playing back the replicated message over a speaker or headset to enable the message to be heard by a controller.

34. The method of claim 33, further comprising:
determining at least one of a frequency and domain via which the digitally-encoded message is to be transmitted to the target aircraft, said at least one of a frequency and domain corresponding to a physical radio communications channel associated with a virtual radio communication channel assigned to the target aircraft.

35. The method of claim 34, further comprising:
identifying an ATC radio facility that supports transmissions for at least one of the frequency and domain that is determined; and
forwarding the encoded message to that ATC radio facility for transmission to the target aircraft.

36. The method of claim 30, further comprising:
encoding an analog signal corresponding to a verbalized message spoken by the controller into a digitally-encoded message;
inserting data corresponding to the digitally-encoded message into one or more packets; and
transmitting the one or more packets from the ATC radio facility to the target aircraft using the transmission mechanism that is identified.

37. The method of claim 36, wherein each packet includes a header that identifies an ATC control facility from which the digitally-encoded message was sent and a target aircraft for which the digitally-encoded message is to be delivered.

38. The method of claim 37, further comprising:
determining, at an aircraft, whether a given packet transmitted under control of the ATC control facility is intended for the aircraft; and
processing the packet if it is intended for the aircraft; otherwise,
discarding the packet if it is not intended for the aircraft.

39. The method of claim 36, wherein the transmission mechanism comprises a sharable physical radio communication channel that may be shared by multiple aircraft; the method further comprising:
including indicia in each packet that identifies the target aircraft.

40. The method of claim 39, further comprising:
automatically detecting when the sharable physical radio communication channel is clear; and, in response thereto,
transmitting at least one packet associated with the digitally-encoded message.

41. The method of claim 30, wherein the controller is enabled to identify the target aircraft by
verbally specifying a call sign for the target aircraft, and in response thereto:
performing a speech-to-text conversion to extract the call sign; and
performing a database mapping that maps the call sign to a unique identifier for the target aircraft.

42. The method of claim 30, wherein the controller is stationed at an ATC control facility including a controller display screen on which air traffic within the ATC airspace division is displayed, the method further comprising:
providing visual indicia identifying the aircraft from which a given voice message originated on the controller's display screen as the message is played back.

43. The method of claim 30, wherein the controller is enabled to identify the target aircraft by:
selecting indicia used to identify the target aircraft from among multiple aircraft identification indicia displayed on a controller's display screen.

44. The method of claim 43, wherein the indicia is selected via one of a touchscreen, trackball, or mouse.

45. The method of claim 43, wherein the indicia is selected using retinal tracking.

* * * * *